Dec. 18, 1945.      W. R. PETERSON ET AL      2,391,342
HEAT MOTOR
Filed June 5, 1942

Inventors:
William R. Peterson and
Joseph E. La Rocque
By: Barnett Truman
Attys.

Patented Dec. 18, 1945

2,391,342

UNITED STATES PATENT OFFICE 2,391,342

HEAT MOTOR

William R. Peterson and Joseph E. La Rocque, Chicago, Ill., assignors to Vapor Car Heating Company, Inc., Chicago, Ill., a corporation of New York Application June 5, 1942, Serial No. 445,840

3 Claims. (Cl. 60—25)

This invention relates to new and useful improvements in a heat motor, and more particularly to an improved motor means for adjusting the position of a valve which controls the flow of fluid-fuel to a space heater.

In an airplane adapted for use at high altitudes, it is desirable to heat the air within the cabin of the plane. It is desirable that the heater used for this purpose, and the controls therefor, be of small weight and high relative efficiency. A fluid-fuel heater has been designed for this purpose, and the valve mechanism for controlling the flow of fuel and air to the heater should be thermostatically controlled in accordance with temperature changes within the heated space. The present invention relates to an improved form of heat motor for actuating the valve mechanism under the control of the thermostat. More specifically this heat motor comprises an expansible bellows diaphragm which is expanded by atmospheric pressure aided by a spring and which is contracted in opposition to the spring and atmospheric pressure by electrically vaporizing a heat responsive fluid within a chamber formed in part by the diaphragm, the flow of current through the electric heater being controlled by a thermostat responsive to temperature changes within the heated space. The contraction of the diaphragm serves to partially throttle a normally open valve which controls the flow of fuel and air to the main heater.

As will be more apparent hereinafter, this improved heat motor and the supporting means and power transmitting connections therefor, as well as the electrical controls associated therewith, are adaptable for various other uses than the one hereinabove referred to by way of example.

The principal object of this invention is to provide an improved form of heat motor as briefly described hereinabove and disclosed more in detail in the specifications which follow.

Another object is to provide an improved form of means for transmitting power from such a heat motor to a valve mechanism.

Another object is to provide improved electrical connections for controlling the heat motor from a thermostat.

Another object is to provide a heat motor which is compact and of light weight.

Another object is to provide improved means for insulating the heat motor against operation by undesired heat from outside sources.

Another object is to provide means for preventing excessive and undesired movement of the valve.

Other objects and advantages of this invention will be more apparent from the following detailed description of one approved form of heat motor and the controlling connections associated therewith.

Figure 1:
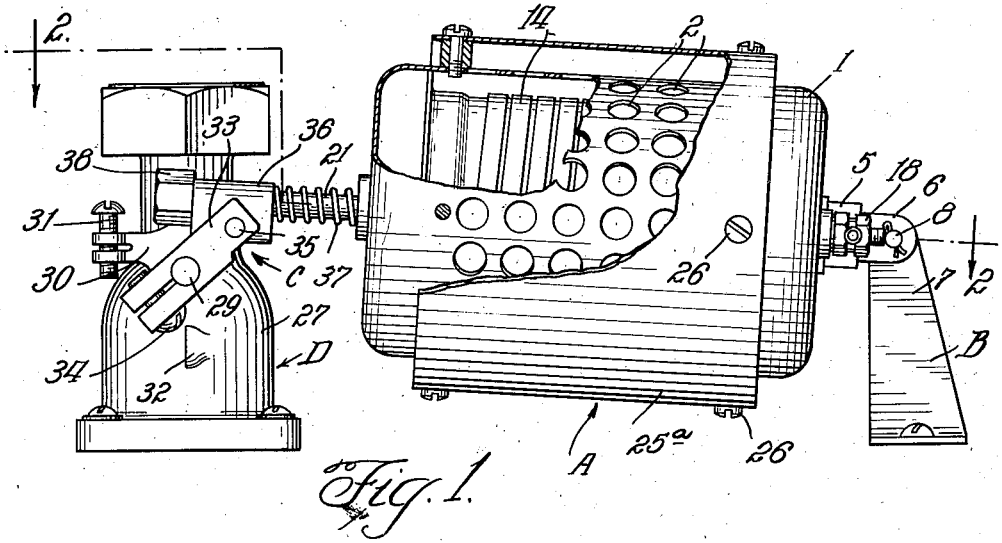
Fig. 1 is an elevation of the improved heat motor (partially broken away) and the valve controlled thereby.

Referring to the drawing, the heat motor assembly indicated generally at A is pivotally supported at one end by the bracket or abutment B and is connected at the other end by the crank and linkage assembly, indicated at C, with the valve mechanism D. The shell 1 encloses and supports the expansible housing or diaphragm E and associated parts, this shell being ventilated through a plurality of openings 2 in the sides and ends thereof. The reduced threaded end portion of the post 3 projects from the inside outwardly through a central opening in the end 4 of shell 1, and is held in place by being threaded into the inner nut portion 5 of the clevis whose forked outer end portion 6 embraces the upwardly projecting plate 7 of the pedestal B and is pivotally secured thereto by the horizontal pin 8.

The imperforate inner housing, indicated as an entirety at E, comprises an outer substantially cylindrical shell portion 9 having a closed end 10 centrally secured to and supported by the post 3, and an inner metallic bellows member 11 secured at one end 12 to the inturned end of cylindrical portion 9 opposite from the head 10 and secured at its other end to the inner plate or head 13 which normally engages the inner surface of head 10 when the housing E is in its contracted or cold position, as shown in the drawing. The interior of the housing is normally under a partial vacuum but contains a relatively small quantity of heat responsive fluid. When the heat responsive fluid is liquefied, the chamber enclosed by the casing 9 and diaphragm 11 will have a minimum volume and the head 13 will be held in engagement with the outer head 10, that is the diaphragm 11 will be fully extended, although the housing E as an entirety will be considered as in its contracted position. When the heat responsive fluid is heated and vaporized, the member E will be expanded so as to move the head 13 away from the fixed head 10 and partially contract or shorten the inner diaphragm 11. A heating coil or ribbon 14 is wrapped around but electrically insulated from the metallic shell or drum 9 and is connected at its ends through wires 15 and 16 with the respective binding posts 17 and 18 mounted in the end 4 of the outer shell 1. These binding posts are connected through wires 19 and 20 to a source of electric energy (not shown) and the energizing circuit through said wires may be opened and closed by any suitable means.

The operating stem 21 projects outwardly through and is slidably guided in the separately formed tube or sleeve 22 mounted in the perforated end portion of outer shell 1. A head 23 of suitable heat-insulating material is mounted at the inner end of stem 21 and engages an inwardly projecting portion 24 at the center of plate 13 so as to center the inner diaphragm or bellows 11. A compression spring 25 surrounds the stem 21 and sleeve 22 and is confined between the outer perforated end of shell 1 and the head 23 so as to reinforce atmospheric pressure in opposing the outward movement of the head 13 of the bellows. The spring 25 is of sufficient strength to materially oppose the expansion of the thermostatic bellows member E despite any material decrease in the prevailing atmospheric pressure so that the operating characteristics of the heat motor will not be greatly changed when the device is used under low atmospheric pressures as found at high altitudes.

The expansion stroke of the stem 21 is limited by the engagement of head 23 with the inner end of guide sleeve 22, the device here shown by way of example being so designed that when electrically heated by ribbon 14 the thermostatic chamber will be in completely collapsed position, as shown in the drawing, at a temperature of 130° but will be expanded to its limit at 170°. The exact proportion of this expansion will be determined by the proportionate length of the entire time that the heating circuit is completed through the coil or ribbon 14.

The shell or casing 1 protects the heat winding 14 and also acts as a frame on which all of the enclosed parts are mounted. This casing is perforated sufficiently to give proper heat dissipation and is protected from radiant heat from other sources by the outer shield 25a supported around and spaced from the frame 1 by the screws 26.

Figure 2:
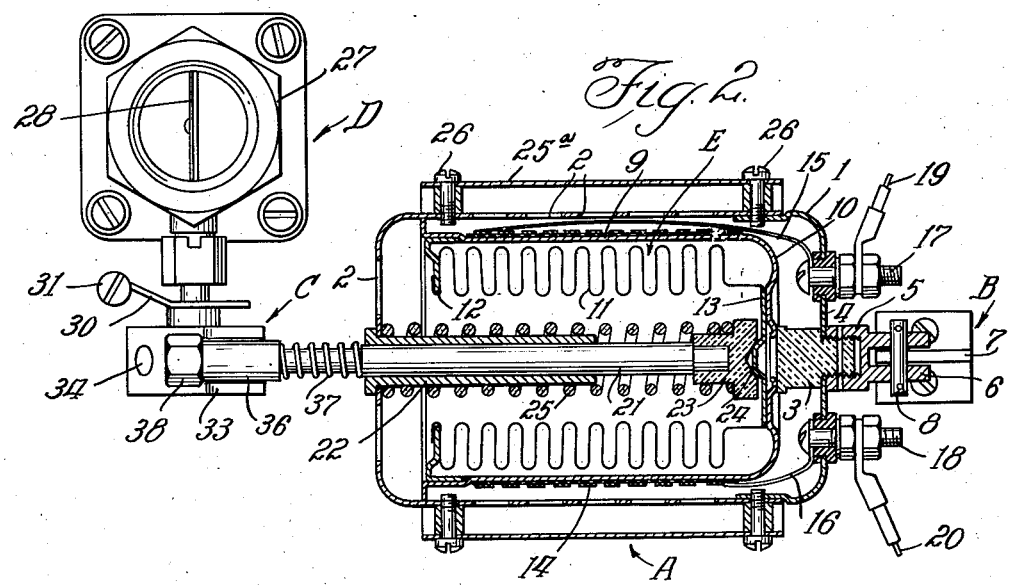
Fig. 2 is a substantially horizontal section taken on the line 2—2 of Fig. 1.

In the present example the driven member is in the form of a valve for controlling the flow of gaseous fuel to a heater, this valve indicated as an entirety at D comprising a valve casing 27 connected in the fuel conduit. The circular valve plate 28 is carried by the rotary adjusting shaft 29 journaled in the valve casing 27 and is shown in the full open position in Figs. 1 and 2. An arm 30 on the outer portion of shaft 29 carries a stop screw 31 adapted to engage a fixed stop shoulder 32 on casing 27 when the shaft 29 and valve 28 are rotated through substantially 90°. By suitably adjusting the screw 31 the movement of valve 28 can be stopped when in nearly closed position, that is a minimum passage for the flow of gas to the burner will be provided. A split crank arm 33 is secured on the outer end portion of shaft 29 by the holding screw 34, and the crank arm 33 is pivotally connected at 35 with a block 36 slidably mounted on the outer end portion of stem 21. A spring 37 on stem 21 is confined between an enlarged portion of the stem and the inner end of block 36 so as to hold this block outwardly against a stop nut 38 threaded on the outer end portion of the stem. The nut 38 will be so adjusted that when the motor A is in fully collapsed position as shown in Figs. 1 and 2, the valve 28 will be in the full open position shown in Fig. 2. When the motor housing E and the stem 21 are fully extended the valve 28 will be closed to its minimum opening with the stop screw 31 against the abutment 32. Compression of spring 37 will permit the stem 21 to be extended to its maximum length, the stem sliding through the block 36 after the valve has reached its minimum position. The arcuate valve-operating movement of crank 33 will be permitted by the tilting or swinging movement of the motor assembly A about its pivotal connection 8 on the supporting pedestal B. These simplified supporting and operating connections make the motor and valve assembly more compact and minimizes the weight thereof.

The entire heat-motor and throttling valve assembly is quite small and compact and light in weight, making it especially suitable for airplane use, and the device is so designed as to minimize the effect of high altitudes and consequent air pressure changes.

We claim:

1. A heat motor comprising an outer ventilated shell, an inner housing secured to the shell, an expansible bellows mounted in the inner housing and having one end portion fixedly secured thereto to provide a chamber for containing heat responsive fluid, an electric heating coil arranged between the outer ventilated shell and the inner housing and adapted when energized to vaporize the fluid and compress the bellows, a stem provided with a head portion of heat-insulating material loosely engaging the movable end of the bellows, a separately formed relatively long sleeve engaging the shell for supporting and guiding the outer end of the stem through an end of the shell, and a spring mounted around the sleeve and confined between said head of insulating material and shell and opposing the contraction of the bellows.

2. A heat motor comprising an outer ventilated shell, an inner housing secured to the shell, a compressible bellows inserted in the housing and having one end portion fixedly secured thereto to provide a chamber for containing heat responsive fluid, an electric heating coil arranged between the outer ventilated shell and the inner housing and adapted when energized to vaporize the fluid and compress the bellows, means for protecting the motor from external heat comprising a shield surrounding the shell and supported thereby in spaced relation thereto, a stem provided with a heat insulating head portion engaging the movable end of the bellows, a separately formed sleeve at the opposite end of the shell for supporting and guiding the other end of the stem through the opposite end of the shell, and a spring mounted around and engaging the sleeve and confined between the head and shell for pressing the said head resiliently against the bellows and opposing the contraction of the bellows.

3. A heat motor comprising an outer ventilated shell, an inner housing inserted in and secured at one end to the shell, a compressible bellows having a closed end portion inserted in the housing and having its other end portion fixedly secured in the housing to provide a chamber for containing heat responsive fluid, an electric heating coil wrapped around the housing and adapted when energized to vaporize the fluid and compress the bellows, a stem provided with a head portion engaging the movable end of the bellows and guided near the other end through the opposite end of the shell, a separately formed guide sleeve extending inwardly from one end of the shell for guiding said stem and to provide a stop limiting the compression of the bellows, a spring mounted around and engaging the sleeve and confined between the head portion and shell and opposing the compression of the bellows.

WILLIAM R. PETERSON.
JOSEPH E. LA ROCQUE.